US008645559B2

(12) United States Patent
Holk et al.

(10) Patent No.: US 8,645,559 B2
(45) Date of Patent: Feb. 4, 2014

(54) REDIRECTION OF MULTIPLE REMOTE DEVICES

(75) Inventors: Eric T. Holk, Redmond, WA (US);
Rajneesh Mahajan, Bellevue, WA (US);
Frank D. Yerrace, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 565 days.

(21) Appl. No.: 12/235,461

(22) Filed: Sep. 22, 2008

(65) Prior Publication Data
US 2010/0077019 A1 Mar. 25, 2010

(51) Int. Cl.
*G06F 15/16* (2006.01)

(52) U.S. Cl.
USPC .......................................... 709/231; 710/62

(58) Field of Classification Search
USPC ......... 709/217, 219–221, 223–224, 226–228, 709/230–232, 238, 246, 248; 710/62, 64, 710/72
See application file for complete search history.

(56) References Cited

U.S. PATENT DOCUMENTS

| 5,703,794 | A | * | 12/1997 | Heddle et al. .................... 700/94 |
| 5,923,850 | A | * | 7/1999 | Barroux ......................... 709/224 |
| 5,968,138 | A | * | 10/1999 | Clough ............................. 710/8 |
| 5,991,836 | A | * | 11/1999 | Renda ............................. 710/58 |
| 6,038,395 | A | * | 3/2000 | Chow et al. .................... 717/105 |
| 6,167,533 | A | * | 12/2000 | Potterveld et al. ............... 714/25 |
| 6,201,611 | B1 | * | 3/2001 | Carter et al. .................. 358/1.15 |
| 6,263,362 | B1 | * | 7/2001 | Donoho et al. ................ 709/207 |
| 6,401,124 | B1 | * | 6/2002 | Yang et al. ..................... 709/228 |
| 6,466,971 | B1 | * | 10/2002 | Humpleman et al. ........ 709/220 |
| 6,667,968 | B1 | | 12/2003 | Tran ............................... 370/352 |
| 6,789,111 | B1 | * | 9/2004 | Brockway et al. ............ 709/222 |
| 6,801,507 | B1 | * | 10/2004 | Humpleman et al. ........ 370/257 |
| 6,940,954 | B1 | | 9/2005 | Toebes ........................ 379/88.17 |
| 7,089,285 | B1 | | 8/2006 | Drell ............................. 709/204 |
| 7,382,730 | B2 | | 6/2008 | Garakani et al. ............... 370/236 |
| 7,532,642 | B1 | * | 5/2009 | Peacock ........................ 370/468 |
| 2004/0054786 | A1 | * | 3/2004 | Kjellberg et al. ............. 709/228 |
| 2004/0236821 | A1 | * | 11/2004 | Metzger et al. ............... 709/200 |
| 2005/0021590 | A1 | * | 1/2005 | Debique et al. ............... 709/200 |

(Continued)

FOREIGN PATENT DOCUMENTS

EP     1443766 A2 *  8/2004

OTHER PUBLICATIONS

Turkowski et al., "Word Endpoint Correction Techniques for a Text-to-Multimedia Composition System," http://ieeexplore.ieee.org/ie15/8408/26514/01180821.pdf?tp=&arnumber=1180821&isnumber=26514, 2002, 1-8.

(Continued)

*Primary Examiner* — Saleh Najjar
*Assistant Examiner* — Eric W Shepperd
(74) *Attorney, Agent, or Firm* — Woodcock Washburn, LLP

(57) ABSTRACT

Example embodiments of the present disclosure provide techniques for multiple audio device capture and playback during a remote desktop session. A custom device manager may instantiate proxy audio input and output devices on the server corresponding to each real device on the client computer. The proxy devices may redirect their respective audio input and output data to the physical device on the client. In an embodiment, multiple audio devices may be instantiated during a remote session, and multiple independent audio streams may be redirected to the selected device on the client computer.

14 Claims, 14 Drawing Sheets

(56) References Cited

U.S. PATENT DOCUMENTS

| | | | |
|---|---|---|---|
| 2005/0080915 A1* | 4/2005 | Shoemaker et al. | 709/231 |
| 2005/0166215 A1* | 7/2005 | Holloway et al. | 719/329 |
| 2005/0226170 A1* | 10/2005 | Relan et al. | 370/254 |
| 2005/0267935 A1* | 12/2005 | Gandhi et al. | 709/203 |
| 2006/0069797 A1* | 3/2006 | Abdo et al. | 709/231 |
| 2006/0142878 A1* | 6/2006 | Banik et al. | 700/17 |
| 2006/0161835 A1 | 7/2006 | Panabaker et al. | 715/203 |
| 2006/0195895 A1* | 8/2006 | Ben-Shachar et al. | 726/11 |
| 2006/0282855 A1* | 12/2006 | Margulis | 725/43 |
| 2007/0005679 A1* | 1/2007 | Bui et al. | 709/201 |
| 2007/0009114 A1 | 1/2007 | Kenoyer et al. | 381/122 |
| 2007/0168062 A1* | 7/2007 | Torrini et al. | 700/94 |
| 2007/0174410 A1 | 7/2007 | Croft et al. | 709/208 |
| 2007/0198669 A1* | 8/2007 | Convertino et al. | 709/220 |
| 2007/0208837 A1* | 9/2007 | Tian et al. | 709/223 |
| 2009/0019187 A1* | 1/2009 | Okuma | 710/9 |
| 2009/0132737 A1* | 5/2009 | Huang et al. | 710/62 |
| 2009/0150909 A1* | 6/2009 | Barreto et al. | 719/324 |
| 2010/0011012 A1* | 1/2010 | Rawson | 707/101 |

OTHER PUBLICATIONS

"Virtual DJ" http://www.virtualdj.com/blog/djcel/blog3787.it.html, downloaded 2008, 1-2.

Mandrekar et al., "An Audio Stream Redirector for the Ethernet Speaker," http://www.prevelakis.net/Papers/inc2004.html, downloaded 2008, 1-8.

* cited by examiner

REDIRECTION OF MULTIPLE REMOTE DEVICES

BACKGROUND

Remote computing systems can enable users to access resources hosted by the remote computing systems. Servers on the remote computing systems can execute programs and transmit signals indicative of a user interface to clients that can connect by sending signals over a network conforming to a communication protocol such as the TCP/IP protocol. Each connecting client may be provided a session, i.e., an execution environment that includes a set of resources. Each client can transmit signals indicative of user input to the server and the server can apply the user input to the appropriate session. The clients may use protocols such as the Remote Desktop Protocol (RDP) to connect to a server resource.

It is becoming increasingly common to see multiple audio devices on a single client computer. With the rise of Voice Over Internet Protocol (VOIP) communications software, users may have a set of speakers that they use for music and other audio and also a headset with a built in microphone or other devices. Desktop multimedia and communication applications can select an audio device to use, which allows the user's music to play from the speakers while the headset is used for voice communications purposes. Some remote protocols may provide support for redirecting audio playback from the server to the client computer and also redirect recorded audio from the client computer to the server. In both cases, however, the audio capabilities are typically directed through a single device. This severely limits the richness available to audio applications, and does not adequately support the multiple device scenario described above. Thus, other techniques are needed in the art to solve the above described problems.

SUMMARY

Methods and systems are disclosed for multiple audio device capture and playback during a remote terminal session. In various embodiments, a custom device manager is disclosed that instantiates proxy audio input and output devices on the server corresponding to each real device on the client computer. The proxy devices may redirect their respective audio streams to the physical device on the client. When a client computer has multiple audio devices, the devices will be made available during the remote session and may be used independently of each other.

Various aspects are disclosed herein for a mechanism to allow loading of a custom audio device manager, and for instantiating a proxy device that may be used to redirect information about the client device (such as the device name, form factor, etc.) to the server. In an embodiment, multiple audio devices may be instantiated during a remote session, and multiple independent audio streams may be redirected to the selected device on the client computer. In further embodiments, per-device compression and buffering settings may be implemented.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Computing Environments in General Terms

Figure 1:
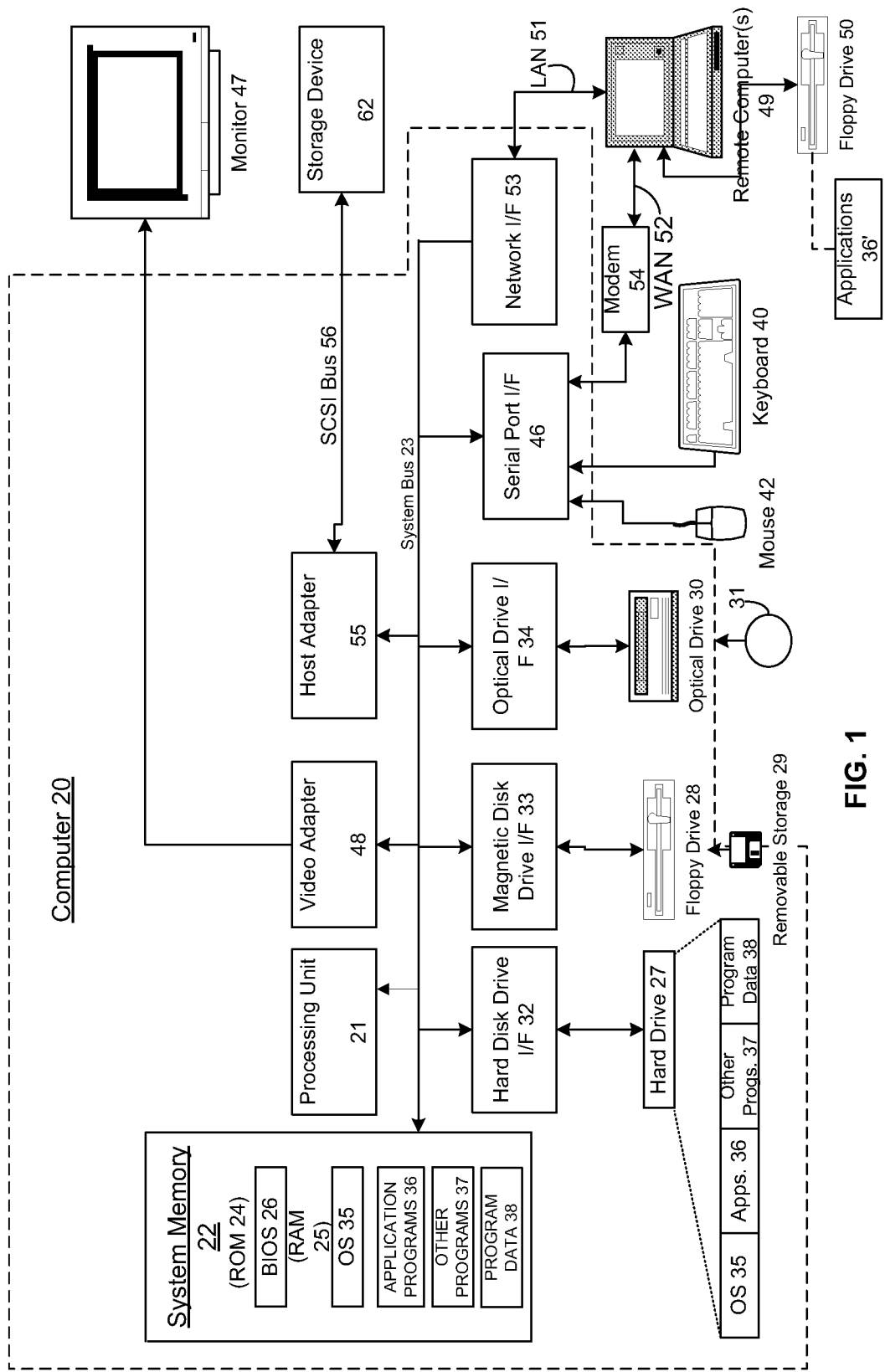
FIG. 1 depicts an example computer system wherein aspects of the present disclosure can be implemented.

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client computer system. The client computer system presents the output data. Thus, input is received and output presented at the client computer system, while processing actually occurs at the terminal server. A session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. It should be understood that the foregoing discussion is exemplary and that the presently disclosed subject matter may be implemented in various client/server environments and not limited to a particular terminal services product.

In most, if not all remote desktop environments, input data (entered at a client computer system) typically includes mouse and keyboard data representing commands to an application and output data (generated by an application at the terminal server) typically includes video data for display on a video output device. Many remote desktop environments also include functionality that extend to transfer other types of data.

Communications channels can be used to extend the RDP protocol by allowing plug-ins to transfer data over an RDP connection. Many such extensions exist. Features such as printer redirection, clipboard redirection, port redirection, etc., use communications channel technology. Thus, in addition to input and output data, there may be many communications channels that need to transfer data. Accordingly, there may be occasional requests to transfer output data and one or more channel requests to transfer other data contending for available network bandwidth.

Figure 2:
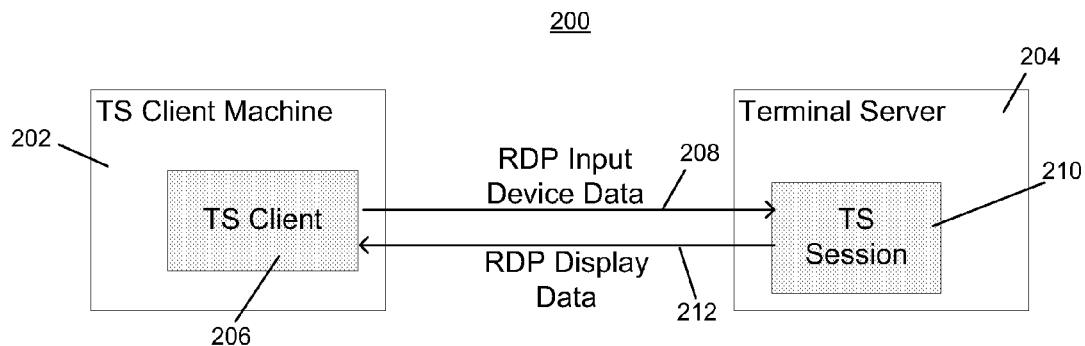
FIG. 2-4 depict an operational environment for practicing aspects of the present disclosure.

FIG. 2 shows an implementation 200 enabling terminal services. A terminal services client machine 202 and a terminal server 204 communicate using RDP. The terminal services client machine 202 runs a terminal services client process 206 that sends RDP input device data 208, such as for example keyboard data and mouse click data, to a terminal services session 210 that has been spawned on the terminal server and receives RDP display data 212, such as user interface graphics data. Generally, the terminal services client process 206 is a thin client process and most processing is provided on the terminal server 204.

Figure 3:
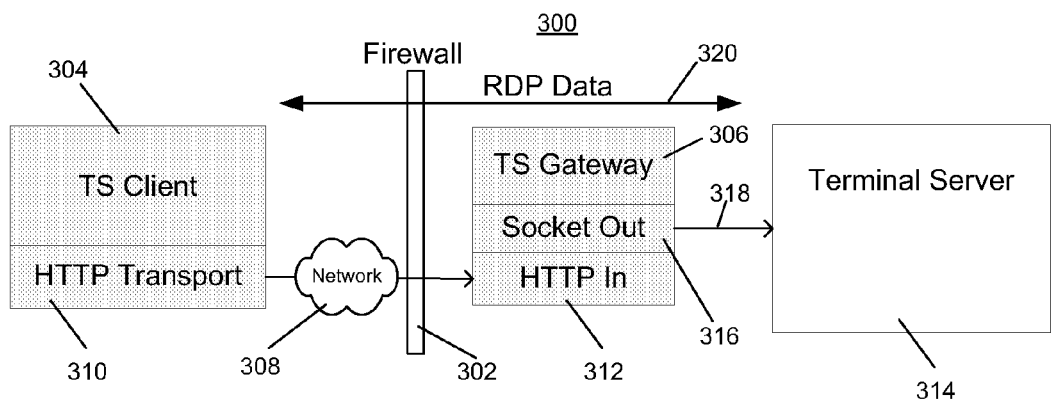

FIG. 3 shows an implementation 300 enabling terminal services through a firewall 302. A remote terminal server client 304 connects to a terminal services gateway (TSG) 306 over a network 308. A Hypertext Transfer Protocol (HTTP) transport process 310 on the terminal server client and an HTTP process 312 on the TSG 306 facilitate communication through the firewall 302. The HTTP transport process 310 wraps data, such as Remote Procedure Call (RPC) data or RDP data, in HTTPS headers for the TSG 306. The TSG 306 may connect to the TS 314 over a socket connection 318 via a socket out process 316. Once the terminal server client 304 is authenticated and a connection is established, RDP data 320 may be passed back and forth between the terminal services client 304 and the terminal server 314.

Figure 4:
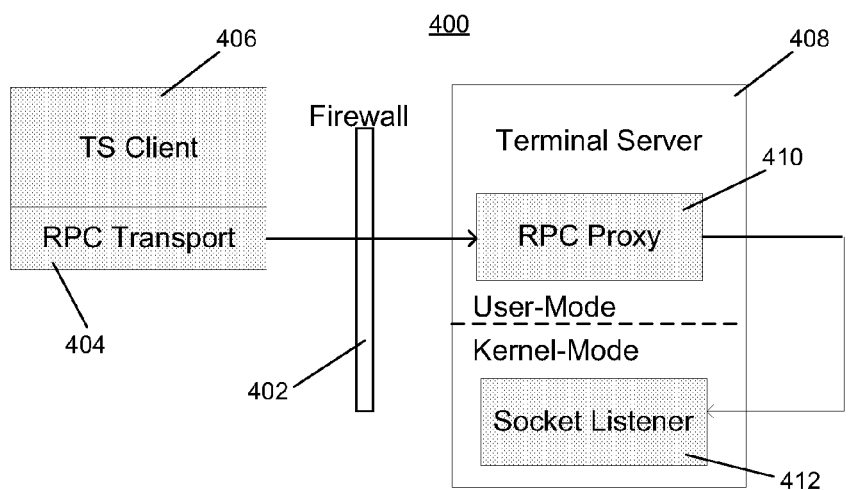

FIG. 4 shows a generalized example of an implementation 400, wherein an existing remote procedure call/hypertext transport protocol (RPC/HTTP) proxy is leveraged, thereby providing a terminal services protocol, such as RDP, over an RPC/HTTP connection through a firewall 402. The architecture of the implementation illustrates that by wrapping the RDP protocol within RPC calls, an existing RPC-based proxy can be advantageously utilized. In particular, an RPC Transport Plug-In 404 on the terminal services client 406 wraps an RDP stream providing communication between the terminal services client 406 and the terminal server 408 within an RPC protocol. This facilitates utilization of an RPC-based proxy, thereby enabling firewall navigation. The RPC-based proxy 410, which may run in a user-mode on the terminal server 408, can forward received data to a socket listener 412, which may run in kernel-mode on the terminal server 408.

As discussed above, clients may use a remote protocol such as Remote Desktop Protocol (RDP) to connect to a resource using terminal services. When a remote desktop client connects to a terminal server via a terminal server gateway, the gateway may open a socket connection with the terminal server and redirect client traffic on the RDP port or a port dedicated to remote access services. The gateway may also perform certain gateway specific exchanges with the client using a terminal server gateway protocol transmitted over HTTPS.

Figure 1A:
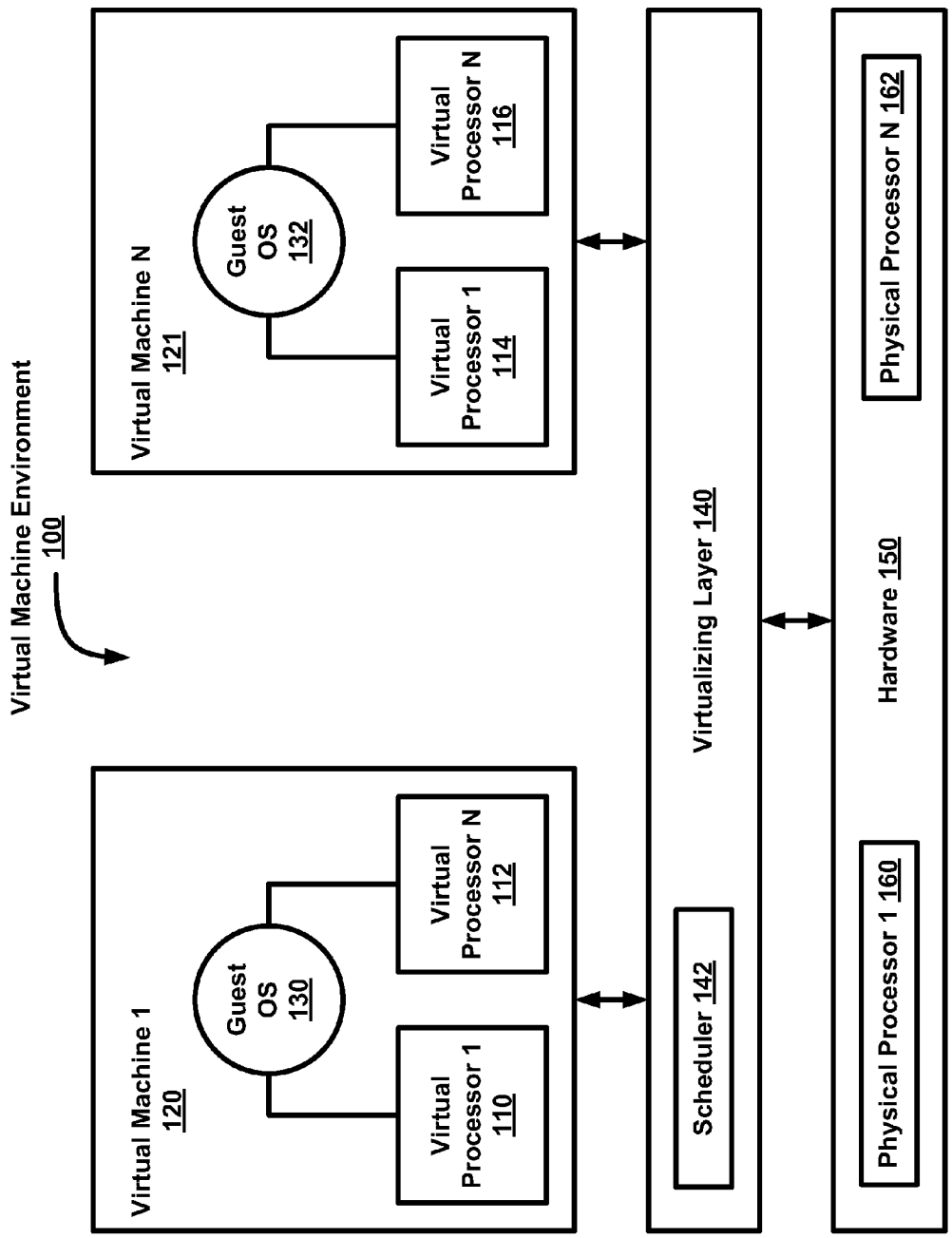
FIG. 1a illustrates a virtual machine environment, with a plurality of virtual machines, comprising a plurality of virtual processors and corresponding guest operating systems; the virtual machines are maintained by a virtualizing layer which may comprise a scheduler and other components, where the vitualizing layer virtualizes hardware for the plurality of virtual machines.

A virtual machine monitor, such as a hypervisor, is a program that creates virtual machines, each with virtualized hardware resources which may be backed by underlying physical hardware resources. FIG. 1a illustrates a virtual machine environment 100, with a plurality of virtual machines 120, 121, comprising a plurality of virtual processors 110, 112, 114, 116, and corresponding guest operating systems 130, 132. The virtual machines 120, 121 are maintained by a virtualizing layer 140 which may be comprised of a scheduler 142 and other components (not shown), where the virtualizing layer 140 virtualizes hardware 150 for the plurality of virtual machines 120, 121. The plurality of virtual processors 110, 112, 114, 116 can be the virtual counterparts of underlying hardware physical processors 160, 162.

All of these variations for implementing the above mentioned partitions are just exemplary implementations, and nothing herein should be interpreted as limiting the disclosure to any particular virtualization aspect.

Multiple Device Redirection

Client and server operating systems typically allow a remote session to use one of the client computer's sound output devices. The audio device interfaces in the remote session is typically limited to supporting a single audio output, depending on the client computer's capabilities and the configuration of the terminal server and client software. Similarly, a server/client configuration may support a single audio input. In various embodiments disclosed herein, a remote session may use more than one of the client computer's sound input or output devices. In one embodiment, an audio device manager is disclosed that executes on the terminal server software and may be configured to manage access to local and remote devices. The audio device manager thus allows an application running on the server to seamlessly provide audio outputs without determining whether the audio device is local or remote. The audio device manager manages the audio devices local to the server, as well as managing the application's access to devices on a remote client computer that the application is servicing during a remote desktop session.

When a remote desktop session is initiated, the audio device manager may request the client computer's audio capabilities such as requesting a list of audio inputs and outputs and corresponding metadata. It should be recognizable to those skilled in the art that audio devices are exemplary and the present disclosure may be embodied in scenarios involving multiple devices of a different category such as video and user interface devices.

In some embodiments, an application programming interface (API) may be provided to enable applications to access the input/output management mechanisms. For example, the API may enable applications to access the audio device manager on the terminal server and query the available sound inputs and outputs. The audio device information may then enable the applications to make decisions, for example, regarding the playing and recording of audio. Such APIs may enable third party application providers to implement support for multiple remote audio devices using the standard interfaces implemented in the API. Applications executing in a remote session may then access the sound inputs and outputs available on the client computer and present these audio input and output devices through the standard APIs in a manner as similar as possible to the manner and form implemented on the client computer.

The API may be used to request information regarding the configuration of audio devices on the client computer and information about the devices, such as whether the device is intended to be used for console, communications, or multimedia audio. Console audio may include items such as system sounds, new mail sounds, instant message notifications, browser link clicks, and the like. The requested information may then be used by multiple applications to transparently access and utilize the available devices as needed by the applications. For example, the communications application may use the headset microphone for generating communications audio while the media player application may choose the desktop speakers plugged into the system. Furthermore, display names and other programmatic or human readable descriptive information about the audio inputs and outputs may be made available to the server application.

The API may also enable implementation of a generic per-device property store. Some of these properties in the property store may be pre-defined and contain information such as a user friendly name for the device or the device's form factor. Some applications, however, may opt to store their own custom data with each device. Custom data may give the application the ability to save application-specific configuration information with each device. For example, an application may choose to exhibit different behavior when capturing data from an external microphone versus the microphone built into the client computer.

In various embodiments a number of high-level functions may be provided in such a multiple remote audio device system. The functions may include but not be limited to audio device management, device property redirection, and multiple audio stream redirection. A device interface is generally an interface exposed via a communication channel exposing an entity on one end of a transport layer connection. An audio device may be a single, tangible audio input or output on the client computer. Typically the device will be a speaker or a microphone.

An audio device manager may be a component in the operating system or audio system that allows applications to query the available audio input and output devices. The audio device manager provides access to local audio devices as well as those on the client computer. The audio device manager may present the local and remote audio devices to the applications such that the application is not aware whether a device is local or remote. In one embodiment of the present disclosure, an audio device manager may be extended to interface to multiple remote audio devices by enabling the audio system to load a plurality of custom device managers for remote sessions. The custom device managers may provide the remote desktop server with information and control over what devices are available remotely and how to use the devices. The custom managers may further allow the redirection of audio output to the appropriate audio devices that are on the client computer.

In one embodiment, when an application executing in the remote session submits a query for the available input and output audio devices, the audio device manager may instantiate a custom device manager that may generate and transmit a request for a list of the remote client computer's audio devices. A stub device manager executing on the remote client computer may receive the request and query the requested information using an API executing on the client computer. The API may implement a client-side standard audio device management interface for use by one or more stub device managers. Client devices may use the API to allow applications such as the stub device manager to query for information related to the devices. The stub device managers thus may use the API to discover the audio devices on the client computer. The information necessary to uniquely identify each audio device may be provided to the stub device manager. The information may then be encoded and transmitted over a communications channel to the requesting custom device manager. The custom device manager, via the audio device manager, may then return this list of devices to the requesting application.

Using such APIs, applications may initiate queries such as reading and storing properties and activating interfaces to be used for playing and recording audio. In a further embodiment, the audio device manager may instantiate one or more proxy devices for each device returned from the client computer. The proxy devices may appear to the application as a local resource, but is actually a proxy for one of the remote audio devices on the remote client computer. Applications on the server may then use these proxy devices to perform operations as if the devices were locally resident. The proxy devices may redirect the application operations related to the remote devices to the client computer such that the remote application appears to be transparently using local devices. The data directed to proxy devices may be collected by the custom device manager which then identifies the corresponding device on the client computer to which the data should be redirected.

In an embodiment, a stub device manager may be provided on the client computer. For example, the remote access software executing on the client computer may include one or more stub device managers. The stub device manager may receive data from the custom device manager executing on the server over one or more communications channels. As discussed above, the data may be transmitted by a custom manager instantiated for the remote session. The stub device manager may further instantiate one or more stub devices that correspond to each of the client side devices reported to the server. Each of these stub devices may further correspond to one of the proxy devices instantiated on the server.

In a further embodiment, audio devices may have an associated property store that allows various data to be associated with the devices. The data may comprise various properties applicable to the audio device or may include data that may be used by the audio application. Examples may include the device's form factor (e.g., speakers, headphones, etc.), the audio formats supported by the device, and an icon for the device. The device may also allow applications to push and store custom information with the device. For example, a score may be associated with a device indicating a device priority. The priority may be used by the application in the event the application needs to choose one device over another.

The device properties may further be synchronized between the client computer and the server to provide a seamless redirected audio experience. Property synchronization may be accomplished by the proxy devices. In an embodiment, when an application reads or sets a property on the audio device, the proxy device may transmit the request (via the audio device manager) over the network to the corresponding stub device (via the stub device manager) on the client computer. The stub device may then perform the read or write operation, as appropriate, on the corresponding client device. The stub device may receive a property from the client device and transmit the result back to the server computer (via the stub device manager).

When the audio device is local, then the property information may be cached on the server. Some device-specific properties may only be meaningful on a local machine. In such cases the proxy device may create an appropriate value for any requested or set properties and handle requests for the property without transmitting the request over the network to the client computer.

The server may redirect multiple independent audio streams to the respective device on the client computer. Applications using the proxy devices may activate a particular interface on the corresponding device on the client computer, which may then be used to provide audio data for playback. An audio API executing on the server may accept audio streams from multiple applications and combine them into a single audio stream. The resulting combined audio stream by then be transmitted to the client device by directing the audio stream to the appropriate proxy device. Each proxy device may retain its own independent state information, and thus the proxy devices may have different configurations. Each proxy device may open a separate channel to the client machine over which audio data may be transmitted.

In a further embodiment, the custom device manager may determine the communication channel parameters such as bandwidth and latency on its respective channel, and may then use this information to encode the audio data using an encoder suitably chosen as a function of the communication channel parameters. For example, a device manager may determine that the bandwidth for a particular channel is low. If the application is providing a voice audio stream, the manager may select a codec that provides greater compression and reduced data-rate. The device may also be configured to use a fixed encoder under certain circumstances. Using a fixed encoder may improve the responsiveness of the audio stream. Because the device configuration is independent of the other devices, each device may use its own encoding settings. For example, a system sounds device may dynamically adjust its settings, a multimedia device may use uncompressed audio for higher audio quality, and a communications device may use a codec that is specially tuned for speech using a higher compression rate.

Figure 5:
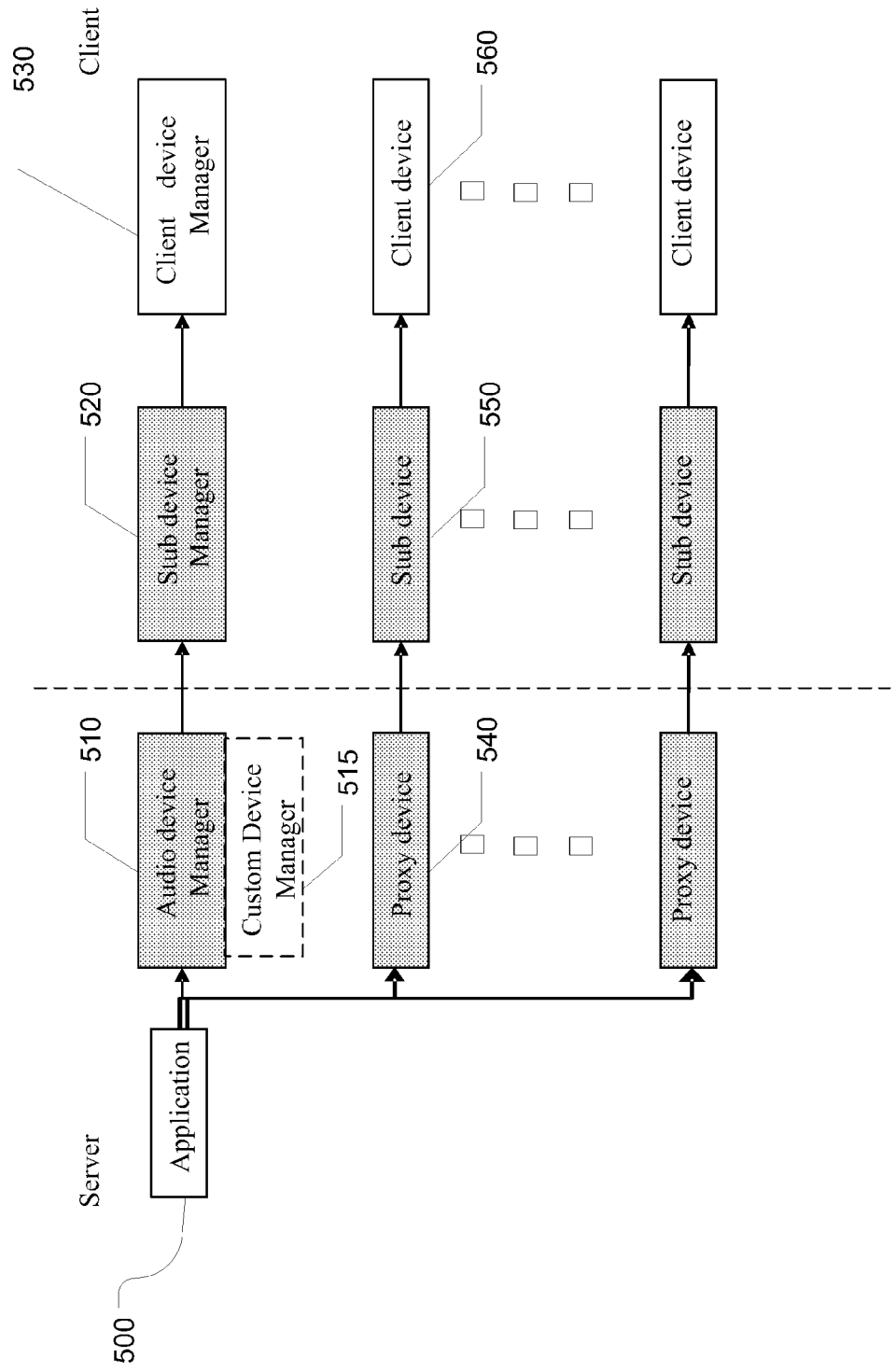
FIG. 5 illustrates an exemplary block diagram depicting various functions and components for a redirecting multiple devices.

Referring to FIG. 5, illustrated is an exemplary block diagram depicting various functions and components for redirecting audio input and output to multiple devices. A server in communication with a remote client computer over a remote terminal session may host at least one application 500 that further generates audio playback targeted to a device on the client computer. An audio device manager 510 may allow the application 500 to query for the available audio input and output devices on the client computer. The audio device manager 510 may notify the application of new devices or advise of any changes to the client computer's configuration if a list of devices has previously been provided.

The application may further load a custom device manager 515 that may be available on the server for remote sessions and communicate to the audio device manager 510 via a standard interface. The custom device manager 515 may initiate communications with a particular audio device and allow redirecting audio input and output to the devices on the client computer when the devices are reported. When the application 500 queries the available audio devices during a remote session, the custom device manager 515 may send a message to the client computer requesting a list of the client's audio devices. A stub device manager 520 on the client computer may, via a standard audio device management interface, request information regarding the audio devices on the client computer. The client device manager 530 may receive the requests for information via the standard interface. An audio device may be a single, tangible sound input or output on the client computer. Typically the device will be a speaker or a microphone.

The client devices may, via an API, to allow the client device manager 530 to query for information. Using the API, the applications may initiate queries such as reading and storing properties and activating interfaces to be used for playing and recording audio. The client device manager 530 may communicate with client devices 560 to query and receive the requested information. The information necessary to uniquely identify each client device 560 may then be encoded and transmitted over a communications channel to the audio device manager 510. The audio device manager 510 may then return this list of client devices 560 to the application 500.

The audio device manager 510 may instantiate proxy devices 540 for each client device 560 returned from the client computer. Application 500 may then use the proxy devices 540 to perform operations as if the client devices 560 were locally resident. The proxy devices 540 may redirect the operations to the client computer via stub devices 550, so the remote application appears to be transparently using the client devices 560.

Figure 6:
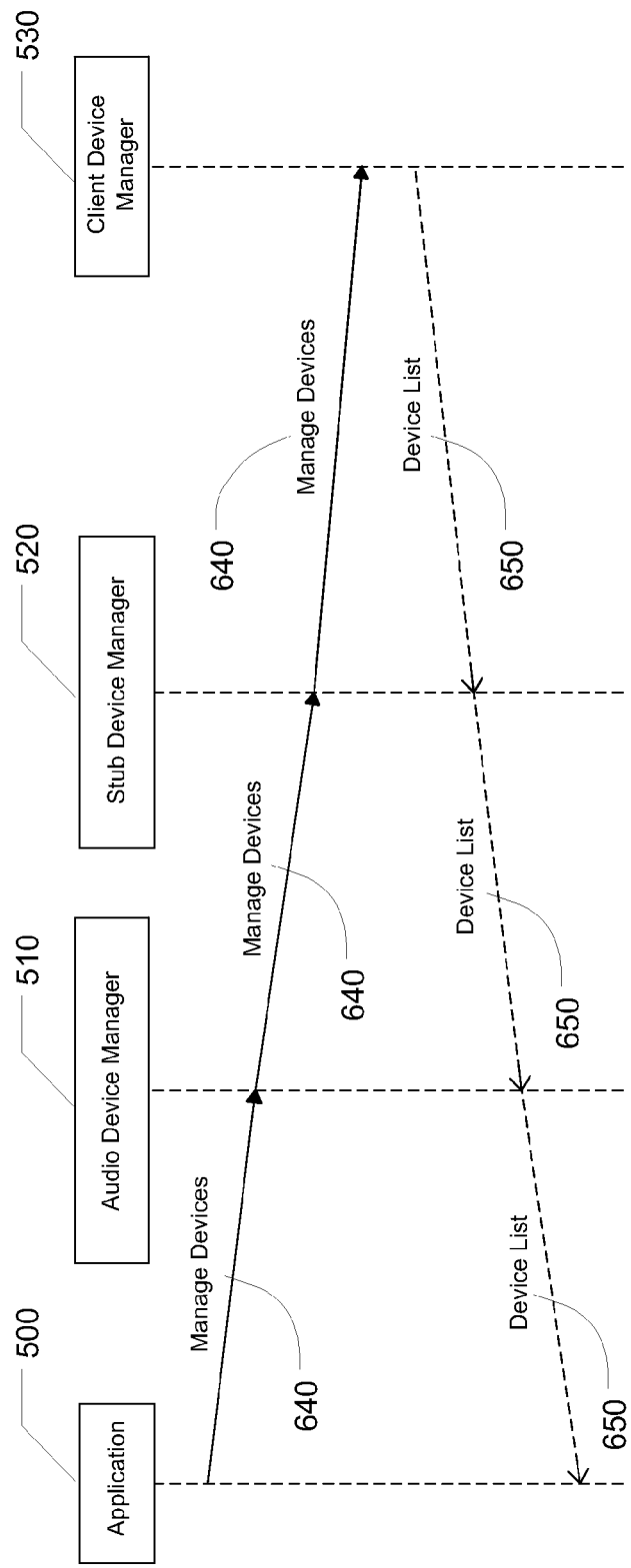
FIG. 6 illustrates an exemplary flow diagram illustrating the discovery of multiple devices.

FIG. 6 depicts an exemplary flow diagram illustrating the discovery of multiple devices. Application 500 may generate a request to enumerate devices 640. The audio device manager 510 allows the application 500 to query for the available audio input and output devices on the client computer. The audio device manager 510 may send a message to the client computer requesting a list of the client's audio devices. A stub device manager 520 on the client computer may receive the request to manage devices 640 and, via a standard audio device management interface, forward the request to manage devices 640 to client device managers 530. The client device manager 530 may receive the requests for information via the standard interface and communicate with client devices 560 to query and receive the requested information. The information necessary to uniquely identify each client device 560 may then be reported as a device list 650. The device list 650 may be encoded and transmitted over a communications channel to the stub device manager 520 on the client computer. The stub device manager 520 may then transmit the encoded device list 650 to audio device manager 510. The audio device manager 510 may then return this list of client devices 560 to the application 500.

The audio device manager 510 may instantiate proxy devices 540 for each client device 560 returned from the client computer. Application 500 may then use the proxy devices 540 to perform operations as if the client devices 560 were locally resident. The proxy devices 540 may redirect the operations to the client computer via stub devices 550, so the remote application appears to be transparently using the client devices 560.

Figure 7:
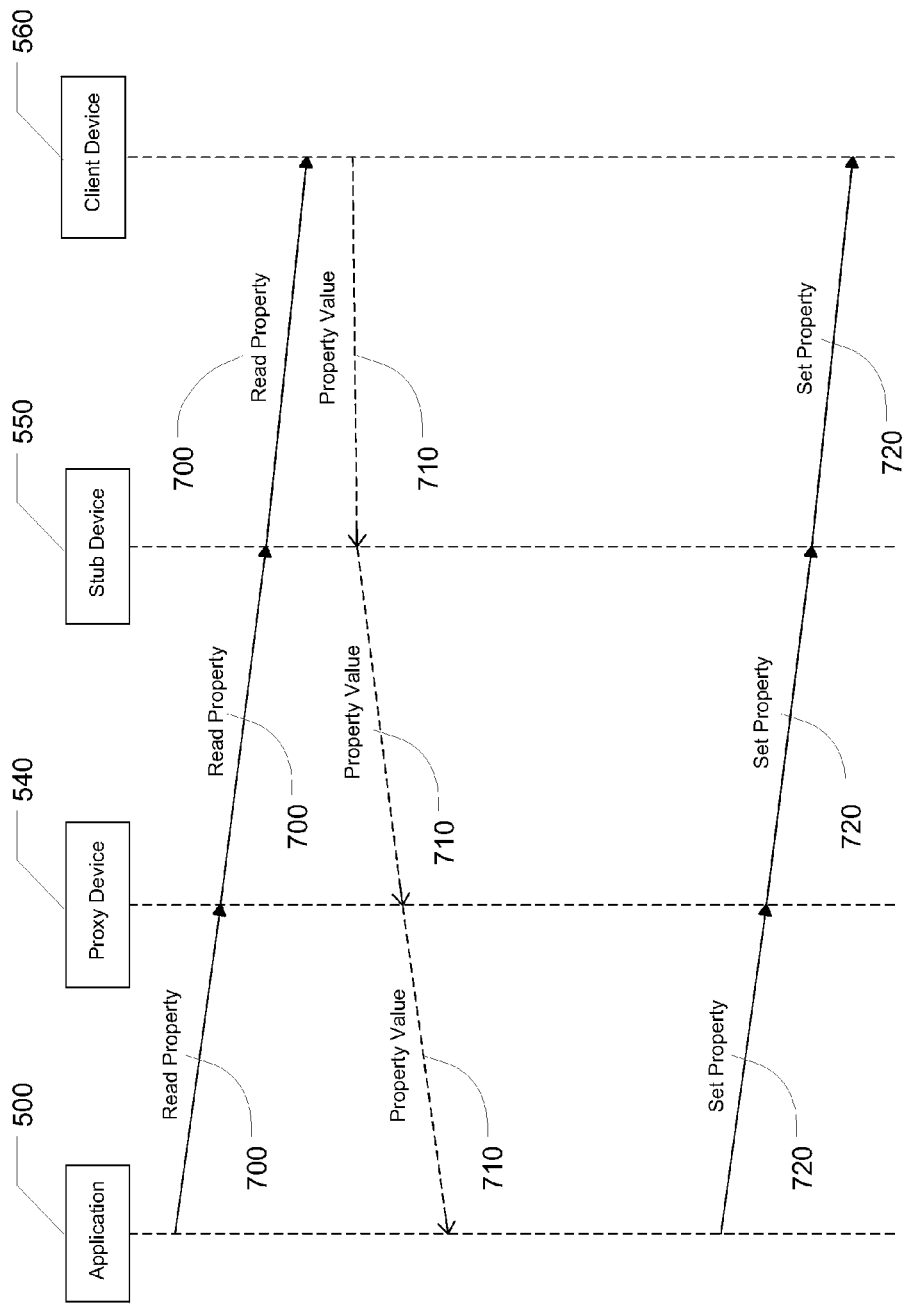
FIG. 7 illustrates an exemplary flow diagram depicting reading and setting properties associated with client devices.

Referring to FIG. 7, illustrated is an exemplary flow diagram depicting reading and setting properties associated with client devices. As described above, client devices may have a property store associated with them that allows arbitrary data to be associated with the devices. The data may comprise properties about the audio device or may include data used by the audio system. Examples include the device's form factor (e.g., speakers, headphones, etc.), the audio formats supported by the device, and an icon for the device. The device may also allow applications to store custom information with the device. An application 500 may generate a request to read a property 700 on a client device. The proxy device 540 may transmit the request to read a property 700 over a communications channel to the stub device 550 on the client computer. The stub device 550 may then perform the read operation by sending the request to read a property 700 to a client device 560. The client device 560 may receive a property value 710 from a local device and transmit property value 710 to the stub device 550. The stub device 550 may then transmit the property value 710 over the communications channel to the proxy device 540. Finally, the proxy device 540 may then provide the property value 710 to the application 500 that originated the request.

An application 500 may also generate a request to set a property 720 on a client device. The proxy device 540 may transmit the request to set a property 720 over a communications channel to the stub device 550 on the client computer. The stub device may then perform the set operation by sending the request to set a property 720 to a client device 560.

Figure 8:
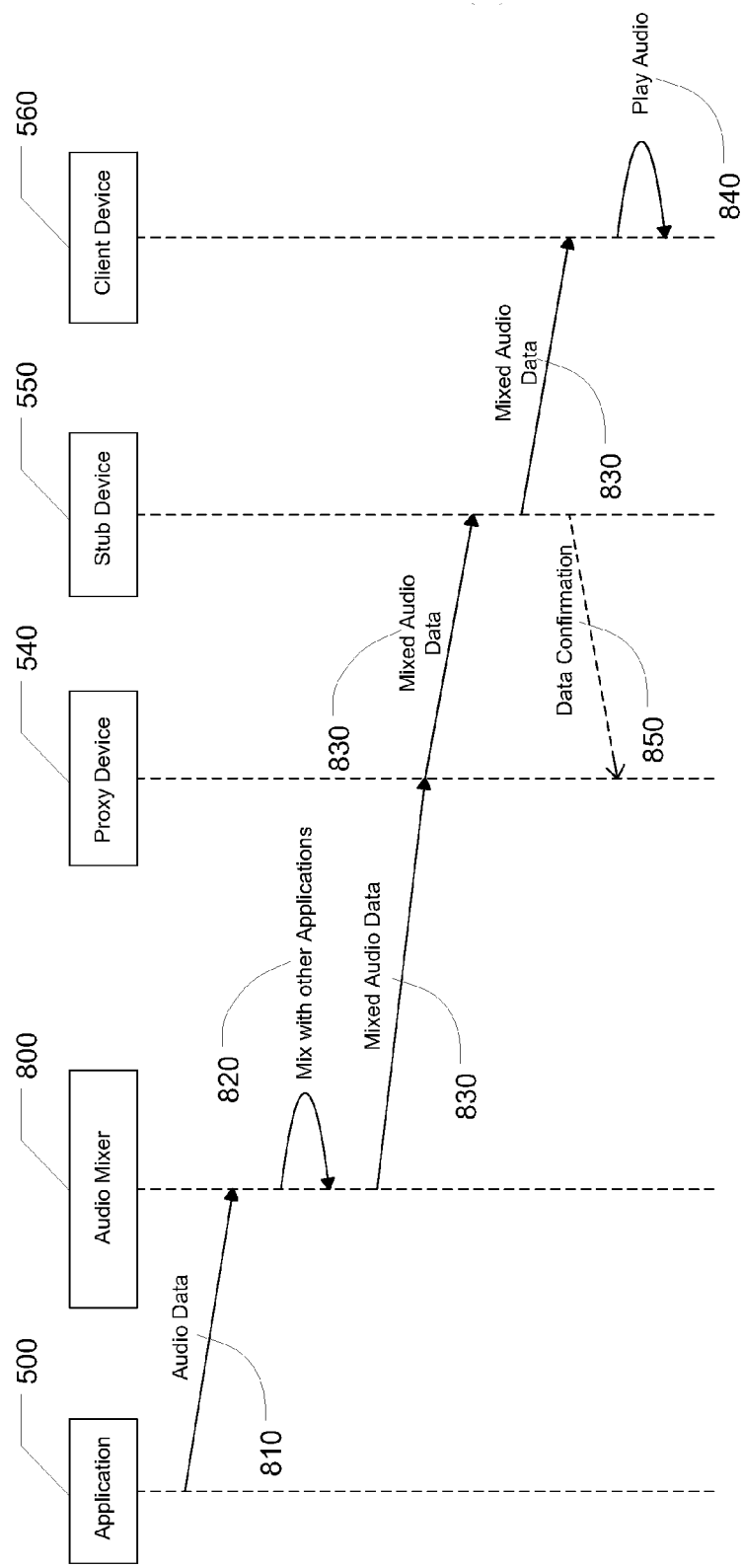
FIG. 8 illustrates an exemplary flow diagram depicting redirecting audio data in a terminal services (TS) environment.

Referring to FIG. 8, illustrated is an exemplary flow diagram depicting redirecting audio input and output in a client server environment. A server providing a remote terminal session may redirect multiple independent audio streams to a target device on the client computer. One or more applications 500 executing on the server may generate one or more audio streams, represented as audio data 81 0. An audio mixer 800 that may be resident on the server may accept audio streams from the one ore more applications 500 and mix the audio streams 820 into a single mixed audio stream 830. The mixed audio data 830 may then be provided to proxy device 540. In such a fashion, applications 500 may activate a particular interface on a client device using the proxy devices 540, which can be used to provide audio data for playback. Each proxy device 540 may open a separate channel to the client computer over which mixed audio data 830 may be transmitted.

The proxy device 540 may transmit the mixed audio data 830 over a communications channel to the stub device 550 on the client computer. The stub device 550 may then feed the mixed audio data 830 to a corresponding client device 560 where the mixed audio data 830 may be played 840 on the target audio device on the client computer.

The following are a series of flowcharts depicting implementations of processes. For ease of understanding, the flowcharts are organized such that the initial flowcharts presents a high level overview and subsequent flowcharts provide further additions and/or details.

Figure 9:
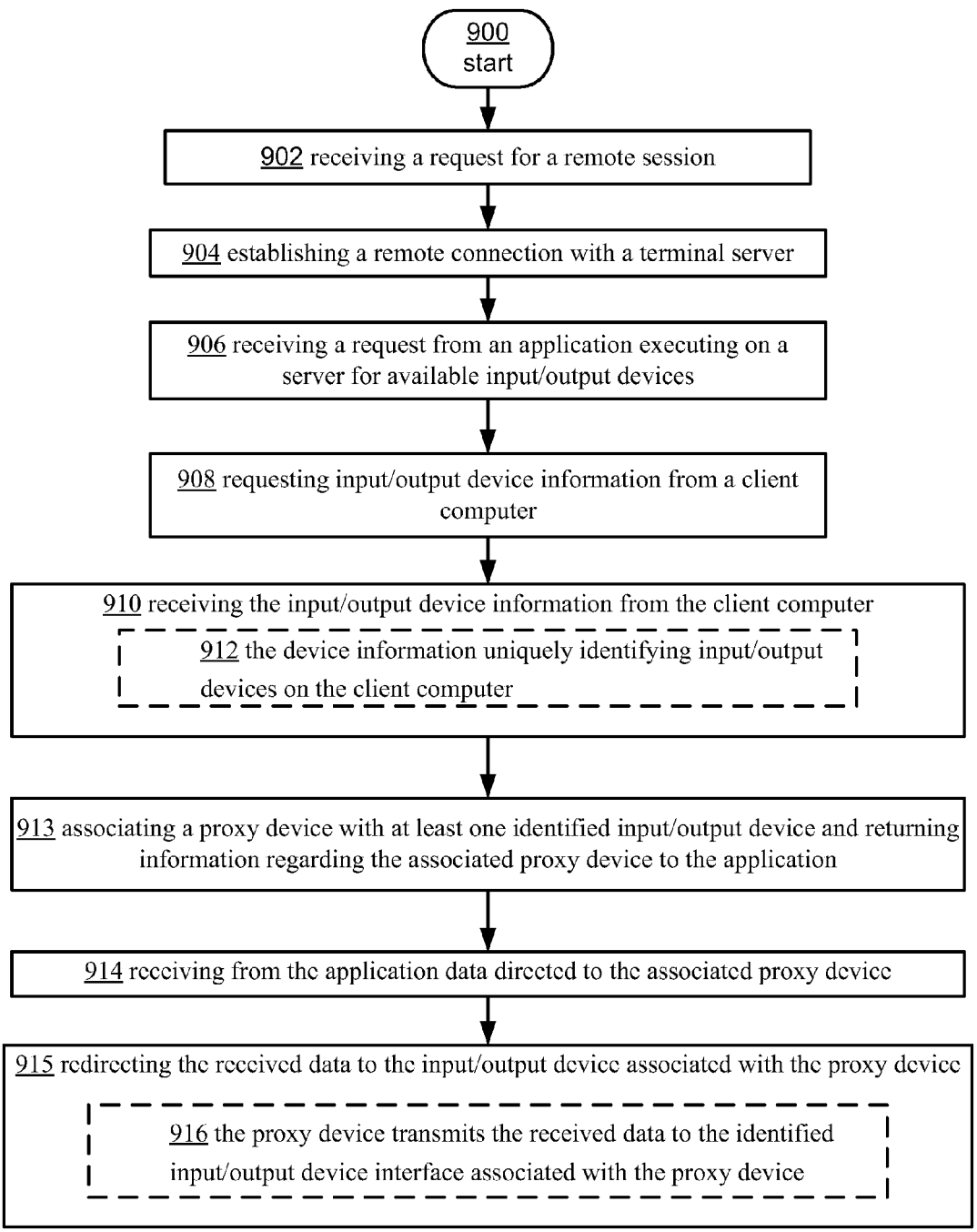
FIG. 9 illustrates an operational procedure for practicing aspects of the present disclosure.
Figure 10:
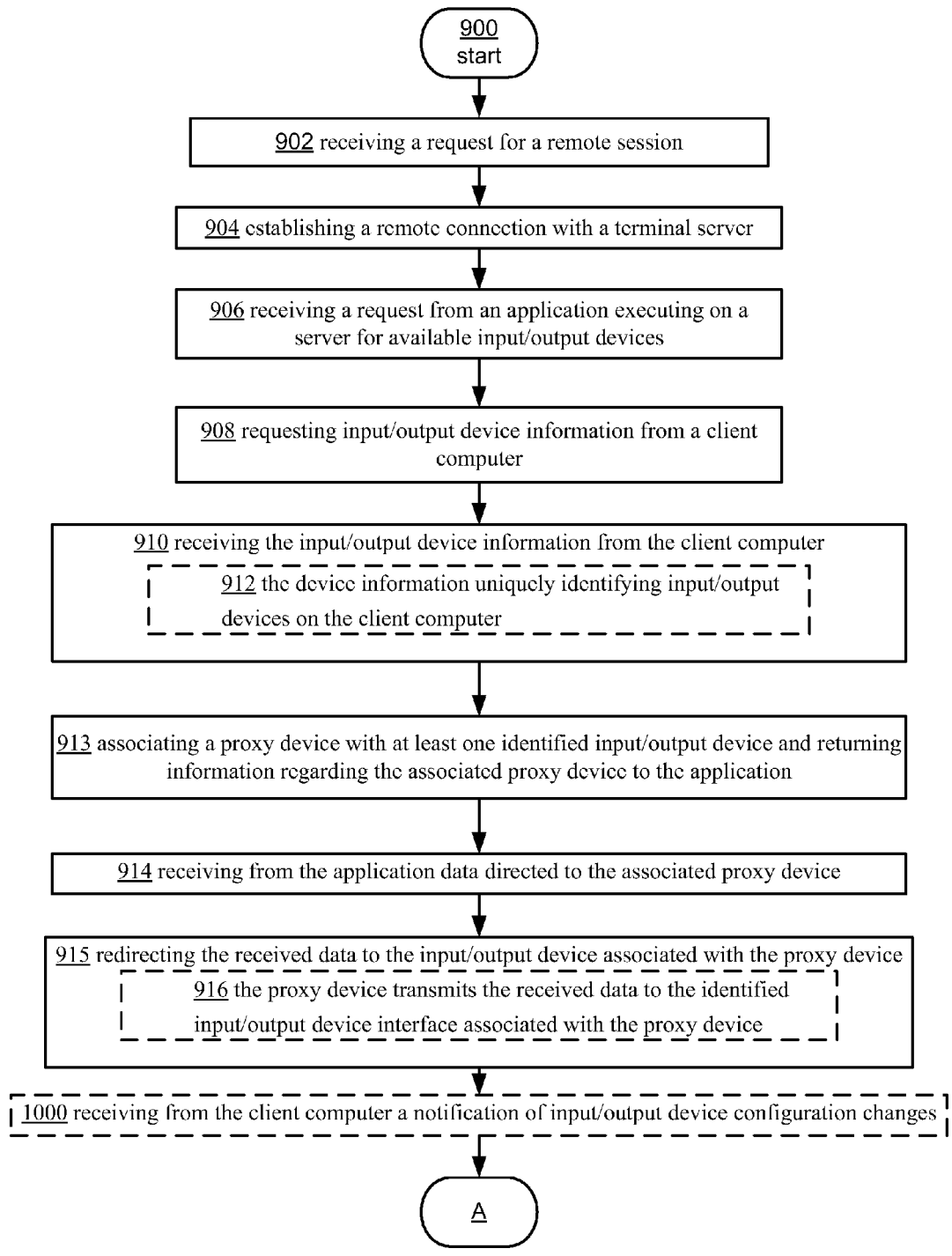
FIG. 10 illustrates an alternative embodiment of the operational procedure of FIG. 9.
Figure 11:
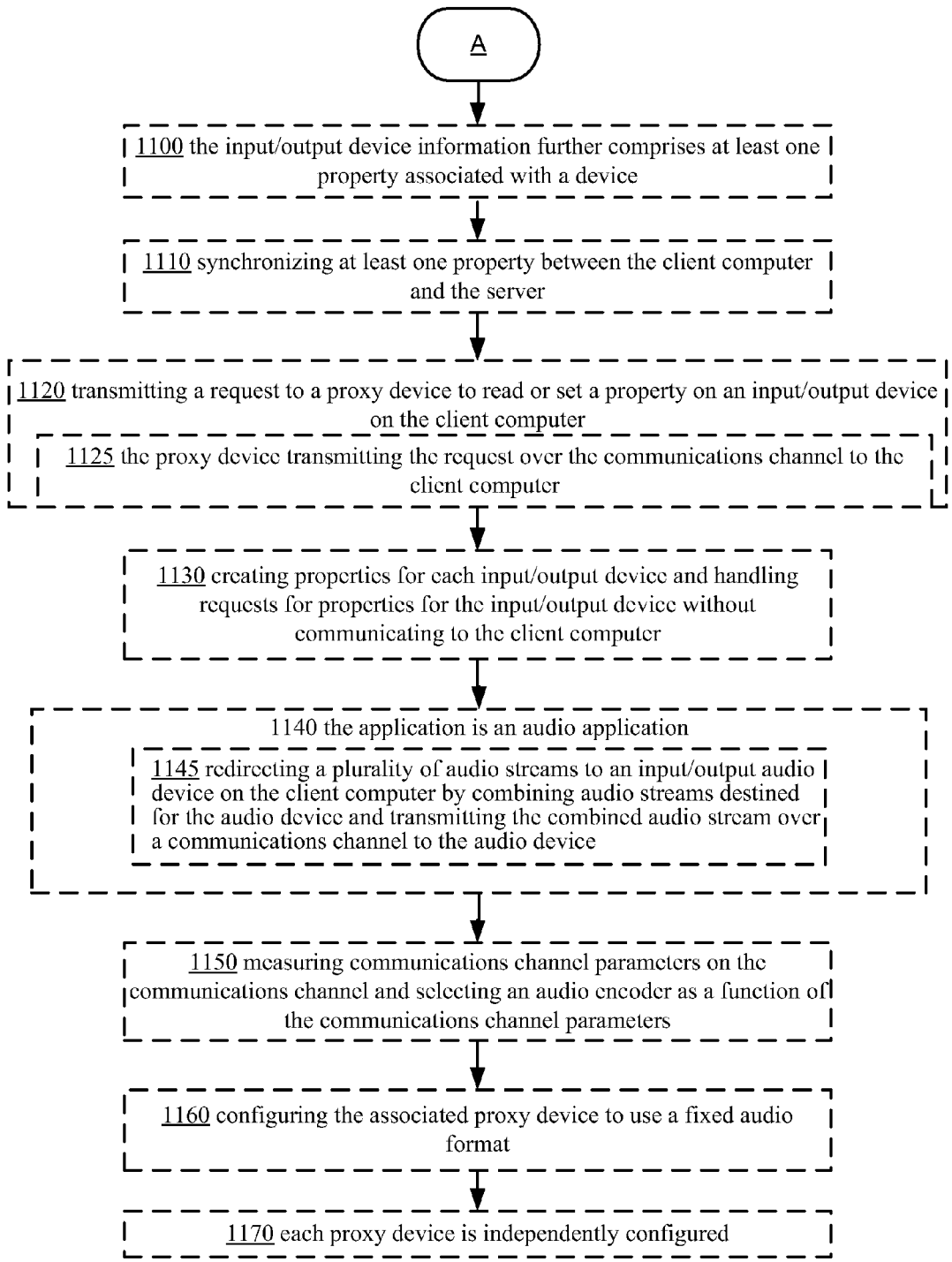
FIG. 11 illustrates an alternative additional embodiments of the operational procedure of FIG. 9.

FIGS. 9 through 11 depict an exemplary operational procedure for redirecting input/output data in a client server environment including operations 900, 902, 904, 905, 906, 908, 910, 912, 913, 914, 915 and 916. Referring to FIG. 9, operation 900 begins the operational procedure and operation 902 illustrates receiving a request for a remote session. Operation 904 illustrates establishing a remote connection with a terminal server. For example, a network adapter of a gateway server can be configured to receive data from a client via a network connection. Prior to exchanging data, a server and client can establish a communication channel. A channel initialization procedure can begin when, for example, a client transmits a connection request to a server via a packet based network. A transport stack of the server can receive the request and forward the information to a session manager that can instantiate a session for the client and instantiate a remote desktop protocol stack instance to service the session. The remote desktop protocol stack instance can be configured to transmit a connection grant signal to the client. The client in this example can then be configured to transmit initialization information to the server in order to configure at least one server side virtual device such as a virtual printer driver, virtual audio driver, virtual video driver, and/or a virtual plug and play device. For example, the client can include a display that has a certain resolution. In this example, the client can send a preferred resolution for the session to the server. In another example, the client can include a printer of a certain type or one or more USB devices operatively coupled to the client such as digital cameras, MP3 players, etc. In this example the client can send information that identifies each device coupled to the client to the server. The server can be configured to receive the information and the server can instantiate one or more redirection drivers to support the client devices and communications channels to route data for the virtual devices to devices operating on the client. In an example embodiment, the data can be transmitted over a communications channel of a remote desktop protocol that is established over a TCP/IP connection. Data can be also be sent from the server to the client. Typically a redirection driver communicates with a hardware component of the computer system. The redirection driver acts as a translator between the hardware component and the data source that uses it. In this example, the redirection driver can be configured to route data to the client via a communications channel over a remote desktop protocol. Once the redirection driver formats the data stream received from the data source, it can send the data to the client via the stack instance for the session.

Operation 906 illustrates receiving a request from an application executing on a server for available input/output devices. Operation 908 illustrates transmitting a message to a client computer requesting the client computer's input/output device information. The audio device manager may instantiate a custom device manager that may generate and transmit a request for a list of the remote client computer's audio devices. A stub device manager executing on the remote client computer may receive the request and query the requested information using an API executing on the client computer. The API may implement a client-side standard audio device management interface for use by one or more stub device managers. Client devices may use the API to allow applications such as the stub device manager to query for information related to the devices. Operation 910 illustrates requesting input/output device information from a client computer. Operation 912 illustrates the device information uniquely identifying input/output device interfaces on the client computer. Operation 913 illustrates associating a proxy device with at least one identified input/output device and returning information regarding the associated proxy device to the application. The proxy devices may appear to the application as a local resource, but actually they are proxies for one of the remote audio devices on the remote client computer. Applications on the server may then use these proxy devices to perform operations as if the devices were locally resident. Operation 914 illustrates receiving from the application data directed to the associated proxy device. Operation 915 illustrates redirecting the received data to the input/output device associated with the proxy device. Operation 916 illustrates that the proxy device transmits the received data to the identified input/output device interface associated with the proxy device. A stub device manager on the client computer may instantiate one or more stub devices that correspond to each of the client side devices reported to the server. Each of these stub devices may further correspond to each of the proxy devices instantiated on the server.

FIG. 10 illustrates an alternative embodiment of the operational procedure 900 of FIG. 9 including further details and refinements. As is depicted in FIG. 10, in operation 1000 illustrates receiving from the client computer a notification of input/output device configuration changes.

Turning to FIG. 11, operation 1100 illustrates the input/output device information further comprises at least one property associated with a device. Operation 1110 illustrates synchronizing at least one property between the client computer and the server. Operation 1120 illustrates transmitting a request to a proxy device to read or set a property on an input/output device on the client computer. The data may comprise various properties applicable to the audio device or may include data that may be used by the audio application. Examples may include the device's form factor (e.g., speakers, headphones, etc.), the audio formats supported by the device, and an icon for the device. Operation 1125 illustrates that the proxy device transmitting the request over the communications channel to the client computer. Operation 1130 creating properties for each input/output device and handling requests for properties for the input/output device without communicating to the client computer. Some device-specific properties may only be meaningful on a local machine. In such cases, the proxy device may create an appropriate value for any requested or set properties and handle requests for the property without transmitting the request over the network to the client computer.

Operation 1140 illustrates that the application is an audio application. Operation 1145 illustrates redirecting a plurality of audio streams to an input/output audio device on the client computer by combining audio streams destined for the audio device and transmitting the combined audio stream over a communications channel to the audio device. An audio API executing on the server may accept audio streams from multiple applications and combine them into a single audio stream. Operation 1150 illustrates measuring bandwidth and latency on the communications channel and selecting an audio encoder as a function of the bandwidth and latency. For example, a device manager may determine that the bandwidth for a particular channel is low. If the application is providing a voice audio stream, the manager may select a more lossy codec that provides greater compression. Operation 1160 illustrates configuring the associated proxy device to use a fixed audio format. Operation 1170 illustrates that each proxy device is independently configured. Because the device configuration is independent of the other devices, each device may use its own encoding settings.

Figure 12:
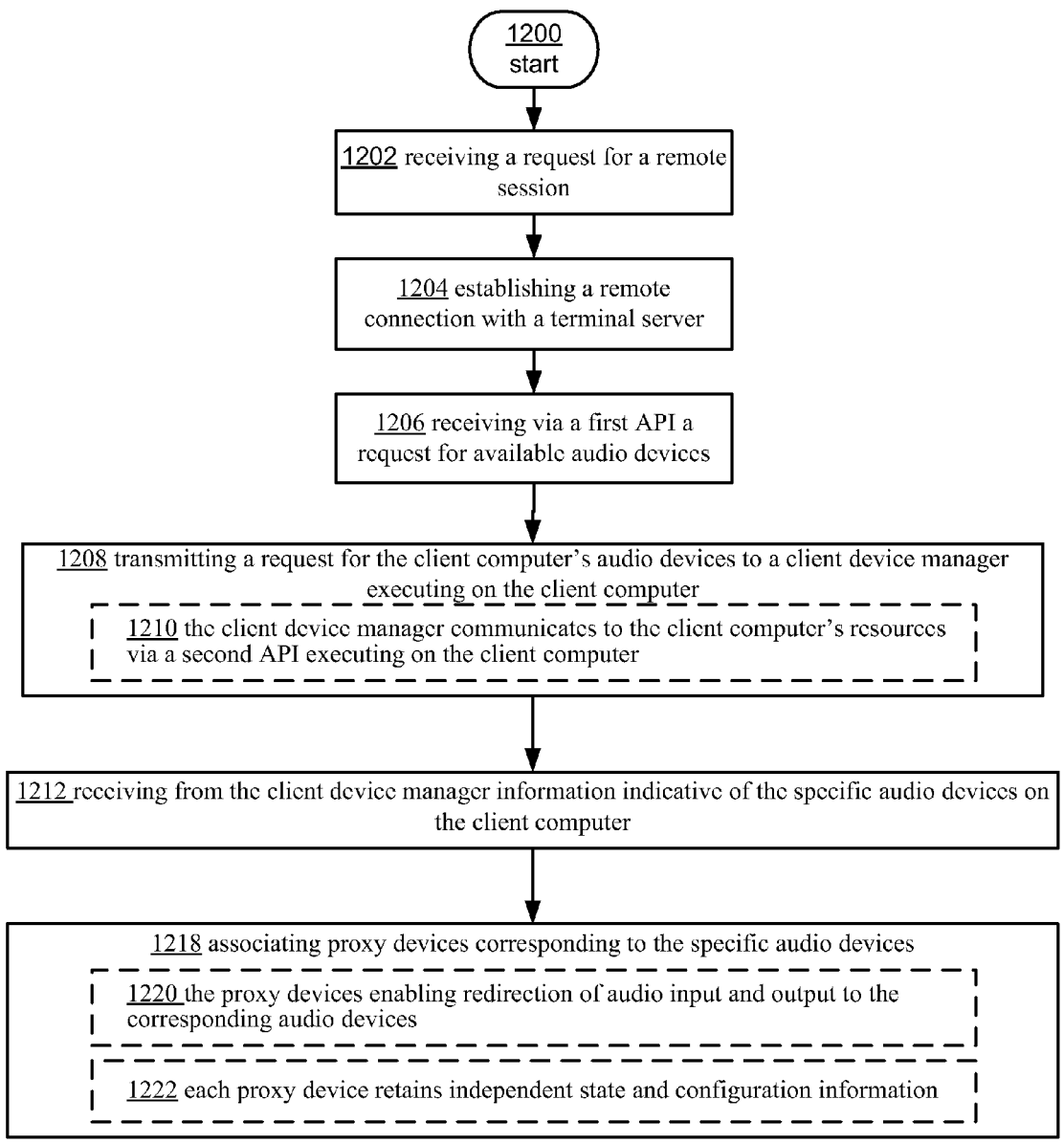
FIG. 12 illustrates an example operational procedure for practicing aspects of the present disclosure.
Figure 13:
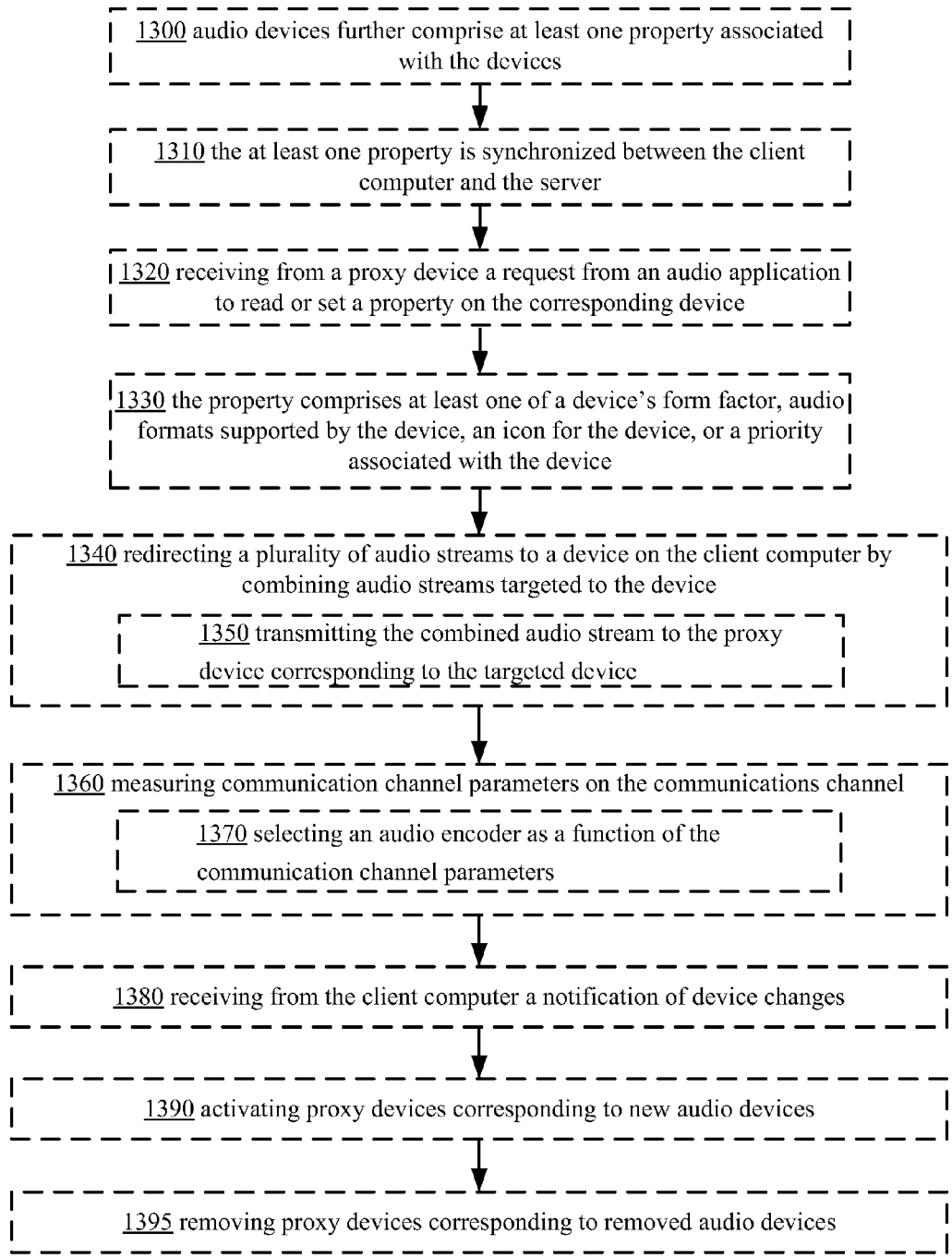
FIG. 13 illustrates an alternative embodiment to the operational procedure of FIG. 12.

FIGS. 12 and 13 depict an exemplary operational procedure for providing services to a client computer over a remote network connection including operations 1200, 1202, 1204, 1205, 1206, 1208, 1210, 1212, 1218, 1220, and 1222. Referring to FIG. 12, operation 1200 begins the operational procedure and operation 1202 illustrates receiving a request for a remote session. Operation 1204 illustrates establishing a remote connection with a terminal server.

Operation 1206 illustrates receiving via a first API a request for available audio devices. Operation 1208 illustrates transmitting a request for the client computer's audio devices to a client device manager executing on the client computer. Operation 1210 illustrates that the client device manager communicates to the client computer's resources via a second API executing on the client computer. Client devices may use the API to allow applications such as the stub device manager to query for information related to the devices. The stub device managers thus may use the API to discover the audio devices on the client computer. Operation 1212 illustrates receiving from the client device manager information indicative of the specific audio devices on the client computer and a corresponding interface for each returned audio device.

Operation 1218 illustrates activating proxy devices corresponding to the received audio devices. The proxy devices may appear to the application a local resources, but actually are proxies for one of the remote audio devices on the remote client computer. Applications on the server may then use these proxy devices to perform operations as if the devices were locally resident. Operation 1220 illustrates that the proxy devices enable redirection of audio input and output to the corresponding audio devices. Operation 1222 illustrates that each proxy device retains independent state and configuration information.

FIG. 13 illustrates an alternative embodiment of the operational procedure 1200 of FIG. 12 including further details and refinements. As is illustrated in FIG. 13, in operation 1300 audio devices further comprise at least one property associated with the devices. Operation 1310 illustrates that the at least one property is synchronized between the client computer and the server. Operation 1320 illustrates receiving from a proxy device a request from an audio application to read or set a property on the corresponding device. Operation 1330 illustrates that the property comprises at least one of a device's form factor, audio formats supported by the device, an icon for the device, or a priority associated with the device.

Operation 1340 illustrates redirecting a plurality of audio streams to a device on the client computer by combining audio streams targeted to the device. An audio API executing on the server may accept audio streams from multiple applications and combine them into a single audio stream. Operation 1350 illustrates transmitting the combined audio stream to the proxy device corresponding to the targeted device. Operation 1360 illustrates measuring bandwidth and latency on the communications channel. Operation 1370 illustrates the further operation of selecting an audio encoder as a function of the bandwidth and latency.

Operation 1380 illustrates receiving from the client computer a notification of device changes. A user on the client computer may add new audio devices or remove connected audio devices. The custom device manager on the server should be notified so that any application in communication with a removed audio device may reconfigure. Likewise, newly added devices should be reported to the application so that the new device may be considered as an input/output device. Operation 1390 illustrates activating proxy devices corresponding to new audio devices. Operation 1395 illustrates removing proxy devices corresponding to removed audio devices.

Figure 14:
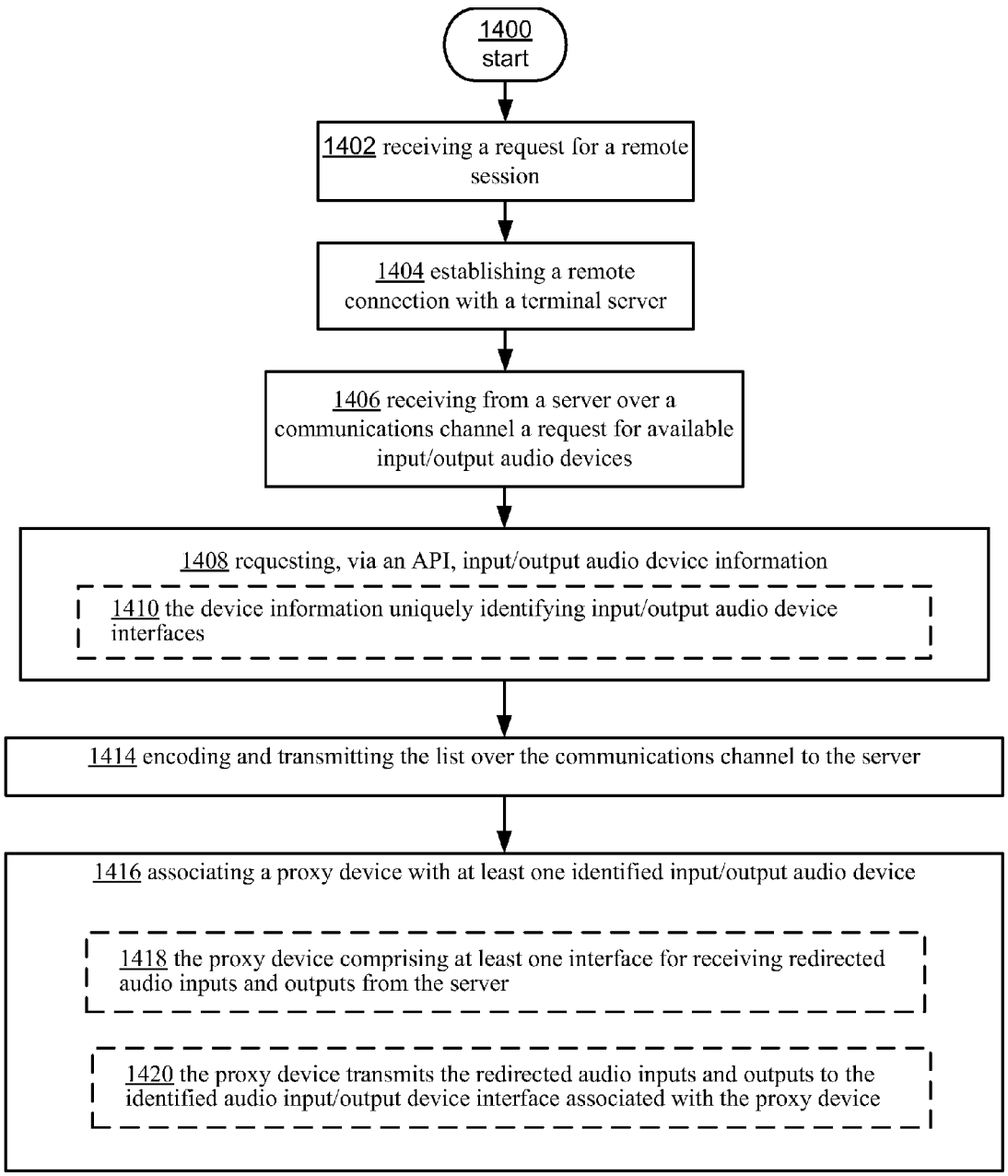
FIG. 14 illustrates an example operational procedure for practicing aspects of the present disclosure.
Figure 15:
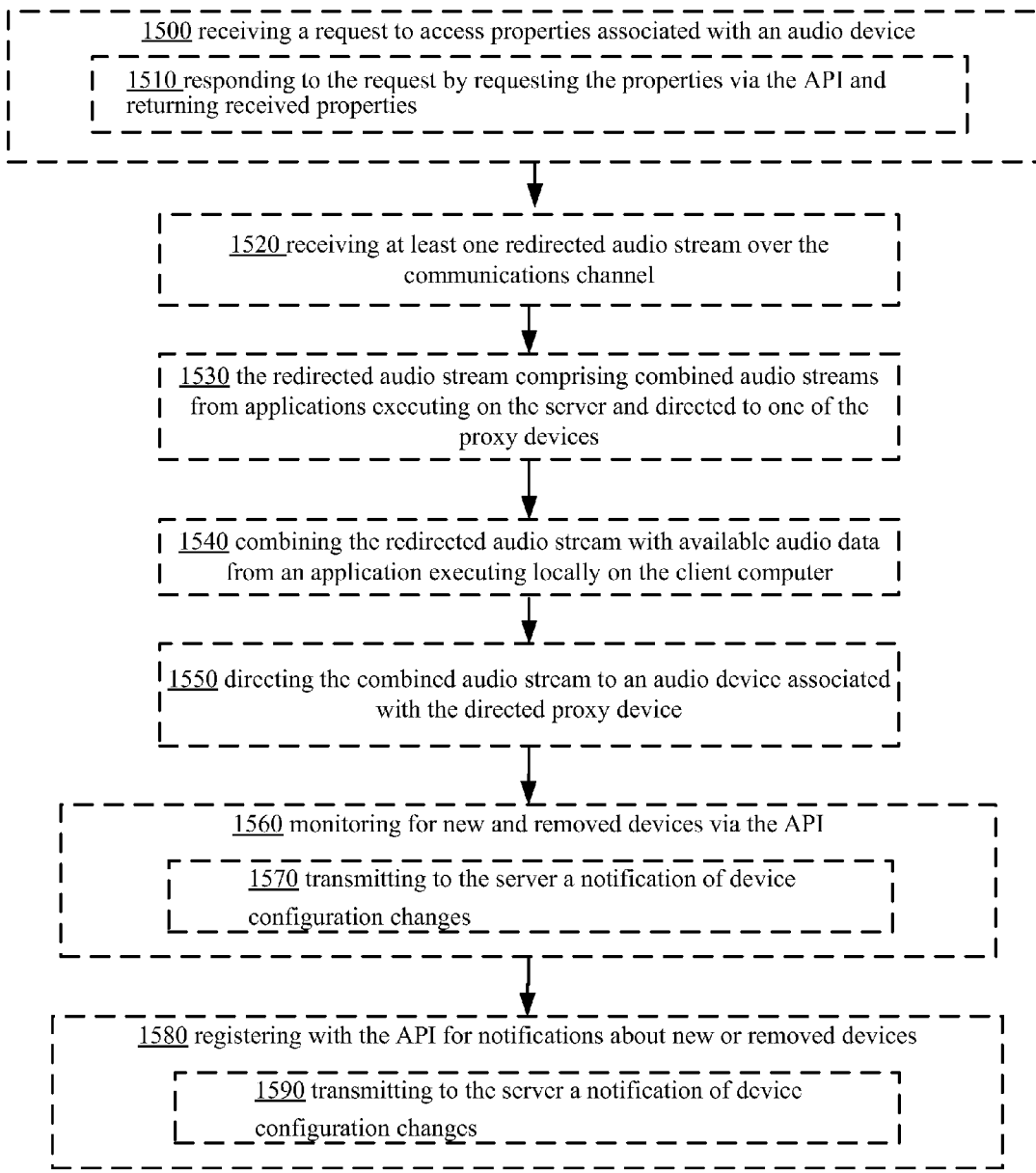
FIG. 15 illustrates an alternative embodiment to the operational procedure of FIG. 14.

FIGS. 14 and 15 depict an exemplary operational procedure for redirecting audio data including operations 1400, 1402, 1404, 1405, 1406, 1408, 1410, 1414, 1416, 1418, and 1420. Referring to FIG. 14, operation 1400 begins the operational procedure and operation 1402 illustrates receiving a request for a remote session. Operation 1404 illustrates establishing a remote connection with a terminal server.

In 1406 a request for available input/output audio devices is received from a server over a communications channel. In 1408 a request for input/output audio device information is requested via an API. Operation 1410 illustrates that the device information uniquely identifies input/output audio device interfaces.

Operation 1414 illustrates encoding and transmitting the list over the communications channel to the server. A proxy device is associated 1416 with at least one identified input/output audio device. Operation 1418 illustrates that the proxy device comprises at least one interface for receiving redirected audio inputs and outputs from the server. The proxy device transmits 1420 the redirected audio inputs and outputs to the identified audio input/output device interface associated with the proxy device.

FIG. 15 illustrates an alternative embodiment of the operational procedure 1400 of FIG. 14 including further details and refinements. As is illustrated in FIG. 15, operation 1500 illustrates receiving a request to access properties associated with an audio device. Operation 1510 illustrates the further operation of responding to the request by requesting the properties via the API and returning received properties.

Operation 1520 illustrates receiving at least one redirected audio stream over the communications channel. Operation 1530 illustrates that the redirected audio stream comprises combined audio streams from applications executing on the server and directed to one of the proxy devices. Each proxy device may open a separate channel to the client machine over which audio data may be transmitted. Operation 1540 illustrates combining the redirected audio stream with available audio data from an application executing locally on the client computer. For example, a process operating on the client computer may request that a sound notification be provided on the speaker system. The speakers may also be playing audio data received from the remote server. The sound notification and remotely received audio may be combined to play simultaneously over the speakers. Operation 1550 illustrates directing the combined audio stream to an audio device associated with the directed proxy device.

Operation 1560 illustrates periodically checking for new and removed devices via the API. Operation 1570 illustrates transmitting to the server a notification of device configuration changes. A user on the client computer may add new audio devices or remove previously connected audio devices. The custom device manager on the server should be notified so that any application in communication with a removed audio device may reconfigure to use an alternate audio device if available. Likewise, newly added devices should be reported to the application so that the new device may be considered as an alternative input/output device. Operation 1580 illustrates registering with the API for notifications about new or removed devices. The local stub device manager may thus receive automatic notifications whenever a device interface is added or removed. Operation 1590 illustrates transmitting to the server a notification of device configuration changes.

As described above, aspects of the invention may execute on a programmed computer. FIG. 1 and the following discussion is intended to provide a brief description of a suitable computing environment in which the those aspects may be implemented. One skilled in the art can appreciate that the computer system of FIG. 1 can in some embodiments effectuate the server and the client of FIGS. 2-4. In these example embodiments, the server and client can include some or all of the components described in FIG. 1 and in some embodiments the server and client can each include circuitry configured to instantiate specific aspects of the present disclosure.

The term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s).

FIG. 1 depicts an example of a computing system which is configured to with aspects of the invention. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the invention may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the invention are particularly well-suited for computer systems, nothing in this document is intended to limit the disclosure to such embodiments.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects and embodiments of the invention described herein have been shown and described, it will be apparent to those skilled in the art that, based upon the teachings herein, changes and modifications may be made and, therefore, the appended claims are to encompass within their scope all such changes and modifications as are within the true spirit and scope of the inventions described herein.

What is claimed:

1. A computer-implemented method for redirecting input/output (IO) data in a client-server environment, the method comprising:
    receiving a request from an application executing on a server for available IO devices;
    in response to the request, requesting IO device information from a client computer;
    receiving the IO device information from the client computer, the IO device information uniquely identifying IO devices on the client computer;
    mapping the uniquely identified IO devices by associating a proxy device with at least one identified IO device and returning information regarding the associated proxy device to the application;
    establishing one or more Remote Desktop Protocol (RDP) communications channels;
    synchronizing proxy device property information for the at least one identified IO device, said synchronizing comprising receiving, via the one or more RDP communications channels, property values from the at least one identified IO device, and further comprising sending, via the one or more RDP communications channels, property values to the at least one identified IO device and receiving a result;
    receiving from one or more applications a plurality of audio streams directed to the associated proxy device;
    measuring communication channel parameters on the one or more RDP communications channels and selecting an audio encoder as a function of the communication channel parameters;
    combining the plurality of audio streams;
    encoding the combined audio streams using the selected audio encoder; and
    redirecting the encoded audio streams to the at least one identified IO device associated with the associated proxy device over the one or more RDP communications channels to the at least one identified IO device.

2. The method of claim 1, further comprising receiving from the client computer a notification of input/output (IO) device configuration changes.

3. The method of claim 1, further comprising creating properties for the available IO devices and handling requests for the properties of the available IO devices without communicating to the client computer.

4. The method of claim 1, further comprising configuring the associated proxy device to use a fixed audio format.

5. The method of claim 1, wherein each proxy device is configured independently of other proxy devices.

6. A system adapted to provide services to a client computer over a Remote Desktop Protocol (RDP) communications channel, comprising:
    at least one processor; and
    at least one memory communicatively coupled to said at least one processor, the memory having stored therein computer-executable instructions that upon execution by the at least one processor cause:
    receiving via a first API a request for available audio devices;

transmitting a request for audio devices to a client device manager executing on the client computer, wherein the client device manager communicates to resources on the client computer via a second API executing on the client computer;

receiving from the client device manager information indicative of specific audio devices on the client computer;

associating proxy devices corresponding to the specific audio devices, the proxy devices enabling mapping and redirection of multiple audio input/output (IO) data streams to corresponding audio devices, wherein each proxy device retains independent state and configuration information;

receiving a plurality of audio streams directed to at least one proxy device;

measuring communication channel parameters on the RDP communications channel and selecting an audio encoder as a function of the communication channel parameters;

combining the plurality of audio streams;

encoding the combined audio streams using the selected audio encoder; and redirecting the encoded audio streams to a specific audio device associated with the at least one proxy device over the RDP communications channel to the specific audio device associated with the at least one proxy device.

7. The system of claim 6, wherein the corresponding audio devices further comprise at least one property associated with the corresponding audio devices, wherein the at least one property is synchronized between the client computer and a server, further comprising:

receiving from a proxy device a request from an audio application to read or set a property on the corresponding audio device.

8. The system of claim 7, wherein the property comprises at least one of a device's form factor, audio formats supported by the device, or application-provided data to be associated with the device.

9. The system of claim 6, further comprising:

receiving from the client computer a notification of device changes;

activating proxy devices corresponding to new audio devices; and removing proxy devices corresponding to removed audio devices.

10. A computer readable storage device storing thereon computer executable instructions for redirecting audio data, comprising:

receiving from a server over a Remote Desktop Protocol (RDP) communications channel a request for available input/output (IO) audio devices;

in response to the request, requesting, via an API, IO audio device information, the IO audio device information uniquely identifying IO audio device interfaces;

encoding and transmitting the IO audio device information over the RDP communications channel to the server;

mapping the uniquely identified IO devices by associating a proxy device with at least one identified IO audio device, the proxy device comprising at least one interface for receiving redirected audio data from the server;

receiving a redirected audio stream over the RDP communications channel via the proxy device, the redirected audio stream comprising combined and encoded data from a plurality audio streams, the encoded data encoded using an encoder selected based on measured communication channel parameters on the RDP communications channel; and directing the redirected audio stream to an audio device associated with the proxy device.

11. The computer readable storage device of claim 10, further comprising:

receiving a request to access properties associated with the audio device, and responding to the request by requesting the properties via the API and returning received properties.

12. The computer readable storage device of claim 10, further comprising:

combining the redirected audio stream with available audio data from a locally executing application; and directing the combined audio stream to the audio device associated with the proxy device.

13. The computer readable storage device of claim 10, further comprising:

monitoring for new and removed devices via the API; and transmitting to the server a notification of device configuration changes.

14. The computer readable storage device of claim 10, further comprising:

registering with the API for notifications about new or removed devices; and transmitting to the server a notification of device configuration changes.

* * * * *